US012761685B2

(12) United States Patent
Wu et al.

(10) Patent No.: US 12,761,685 B2
(45) Date of Patent: Oct. 13, 2026

(54) BALANCING ASSEMBLY WITH GOOD TACTILE FEEL

(71) Applicant: DONGGUAN CITY KAIHUA ELECTRONICS CO.LTD, Dongguan (CN)

(72) Inventors: Fuxi Wu, Dongguan (CN); Panhao Lv, Dongguan (CN)

(73) Assignee: DONGGUAN CITY KAIHUA ELECTRONICS CO. LTD, Dongguan (CN)

( * ) Notice: Subject to any disclaimer, the term of this patent is extended or adjusted under 35 U.S.C. 154(b) by 32 days.

(21) Appl. No.: 18/996,377

(22) PCT Filed: Jul. 24, 2023

(86) PCT No.: PCT/CN2023/108848
§ 371 (c)(1), (2) Date: Jan. 17, 2025

(87) PCT Pub. No.: WO2024/045951
PCT Pub. Date: Mar. 7, 2024

(65) Prior Publication Data

US 2026/0029813 A1 Jan. 29, 2026

(30) Foreign Application Priority Data

Aug. 29, 2022 (CN) ......................... 202222284654.4

(51) Int. Cl.

| | |
|---|---|
| ***G05G 5/03*** | (2008.04) |
| ***G05G 1/02*** | (2006.01) |
| ***H01H 13/14*** | (2006.01) |
| *G05G 25/00* | (2006.01) |

(52) U.S. Cl.
CPC ................. *G05G 5/03* (2013.01); *G05G 1/02* (2013.01); *H01H 13/14* (2013.01); *G05G 25/00* (2013.01)

(58) Field of Classification Search
CPC ...................................................... G05G 25/00
See application file for complete search history.

(56) References Cited

U.S. PATENT DOCUMENTS

| | | | |
|---|---|---|---|
| 2008/0031673 A1* | 2/2008 | Chang .................. | G06F 1/1613 400/490 |
| 2017/0178841 A1* | 6/2017 | Hsu ........................ | H01H 11/00 |
| 2018/0019078 A1 | 1/2018 | Chen | |

(Continued)

FOREIGN PATENT DOCUMENTS

| | | |
|---|---|---|
| CN | 106128830 A | 11/2016 |
| CN | 107818882 A | 3/2018 |
| CN | 209626103 U | 11/2019 |

(Continued)

OTHER PUBLICATIONS

International search report of PCT/CN2023/108848.

*Primary Examiner* — Vicky A Johnson

(57) ABSTRACT

A balancing assembly with a good tactile feel. The balancing assembly comprises a lower fixing plate (1),an upper fixing plate (2) and a balancing frame (3) arranged between the upper fixing plate (2) and the lower fixing plate (1),wherein a flexible plate (4) is arranged on the upper fixing plate (2). The balancing assembly with a good tactile feel achieves a good pressing sensation while also achieving smooth pressing, thereby providing a good user experience.

9 Claims, 4 Drawing Sheets

(56) References Cited

U.S. PATENT DOCUMENTS

2021/0225601 A1* 7/2021 Wu ........................ H01H 13/14

FOREIGN PATENT DOCUMENTS

| | | |
|---|---|---|
| CN | 211455588 U | 9/2020 |
| CN | 214099467 U | 8/2021 |
| CN | 215680485 U | 1/2022 |
| CN | 219123135 U | 6/2023 |

* cited by examiner

BALANCING ASSEMBLY WITH GOOD TACTILE FEEL

TECHNICAL FIELD

The utility model relates to the field of key switches, in particular to a balance component with good hand feeling.

TECHNICAL BACKGROUND

In the existing key switches, in order to realize the function of smooth pressing, a balancing frame structure is often installed, and at the same time, a hard plate is needed to install the balancing frame structure, but the hard plate structure has poor hand feeling and poor user experience when pressing.

CONTENT OF UTILITY MODEL

In view of the above shortcomings, the purpose of the utility model is to provide a balancing assembly with a good tactile feel, which not only realizes smooth pressing, but also has good pressing hand feeling and provides good user experience.

The technical scheme adopted by the utility model is as follows:

A balancing assembly with a good tactile feel comprises a lower fixing plate, an upper fixing plate and a balancing frame arranged between the upper fixing plate and the lower fixing plate, and is characterized in that a flexible plate is arranged on the upper fixing plate.

As a further improvement of the utility model, the flexible plate has an upper arch part, and an accommodating cavity is formed in the upper arch part, and the upper fixing plate is embedded in the accommodating cavity.

As a further improvement of the utility model, the flexible plate is mainly composed of the upper arch, an expanding part connected to the periphery of the lower part of the upper arch, and a base plate connected to the periphery of the expanding part.

As a further improvement of the utility model, a plurality of positioning protrusions are projected downward at the top of the upper arch, and a plurality of positioning jacks for inserting the positioning protrusions are provided on the upper fixing plate.

As a further improvement of the utility model, the flexible plate is soft glue.

As a further improvement of the utility model, the soft glue is silica gel.

As a further improvement of the utility model, the upper fixing plate is a hard plate.

As a further improvement of the utility model, the lower part of the balancing frame is rotatably connected to the lower fixing plate, and the upper part is rotatably connected to the upper fixing plate.

As a further improvement of the utility model, a central perforation is respectively formed on the flexible plate, the upper fixing plate and the lower fixing plate, and the flexible plate, the upper fixing plate and the lower fixing plate correspond to the central perforation from top to bottom.

The utility model has the beneficial effects that: The upper fixing plate is wrapped by adding a flexible plate to the balance assembly. The flexible plate can be a soft rubber, such as silica gel. Since the flexible plate has the characteristics of elasticity, softness and flexibility, when pressed downward, it directly acts on the flexible plate instead of the upper fixing plate, thereby creating a good pressing feel. At the same time, combined with the structure of the balancing frame, it has a good pressing feel and provides a good user experience while achieving smooth pressing.

The above is an overview of the technical scheme of the utility model, and the following is a further explanation of the utility model with the attached drawings and specific embodiments.

EMBODIMENT

In order to further explain the technical means and effects adopted by the utility model to achieve the predetermined purpose, the specific implementation of the utility model will be described in detail with the attached drawings and preferred embodiments.

Figure 1:
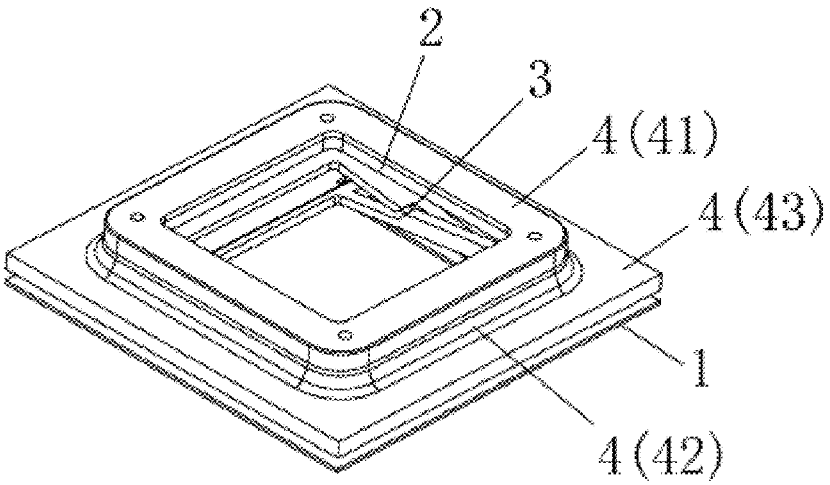
FIG. 1 is a schematic diagram of the overall external structure of the utility model.
Figure 2:
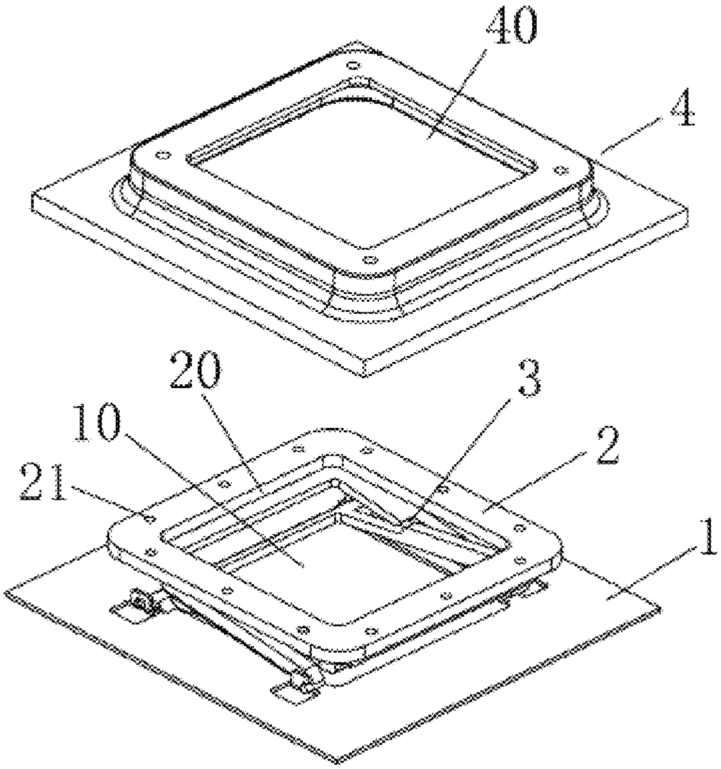
FIG. 2 is an exploded view of the utility model.

Please refer to FIG. 1 and FIG. 2. The embodiment of this utility model provides a balancing assembly with a good tactile feel, which includes a lower fixing plate 1, an upper fixing plate 2, and a balancing frame 3 arranged between the upper fixing plate 2 and the lower fixing plate 1. The balancing frame 3 arranged between the upper fixing plate 2 and the lower fixing plate 1 provides a pressing balance force, so that the whole assembly can press down smoothly every place on the upper fixing plate 2, and the balanced pressing function is realized. At the same time, the upper fixing plate 2 is provided with a flexible plate 4. Because the flexible plate 4 has the characteristics of elasticity, softness and flexibility, it can produce a good hand feeling and provide a good user experience when pressed downward.

Specifically, because the flexible plate 4 is arranged on the upper fixing plate 2, when it is pressed down, the force directly acts on the flexible plate 4, and then acts on the upper fixing plate 2, so the flexible plate 4 can give people a good hand feeling.

Figure 3:
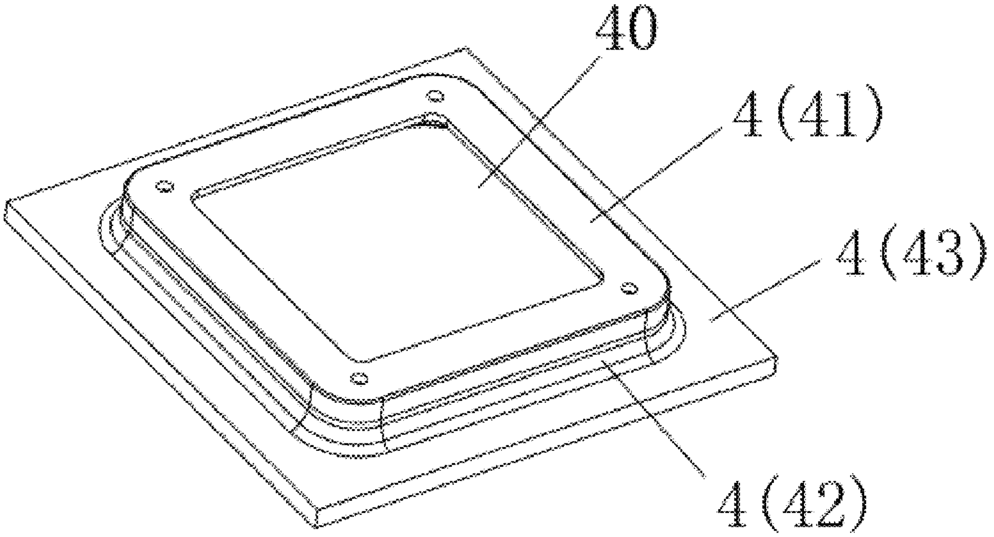
FIG. 3 is a schematic diagram of the upper surface structure of the flexible plate in the utility model.
Figure 4:
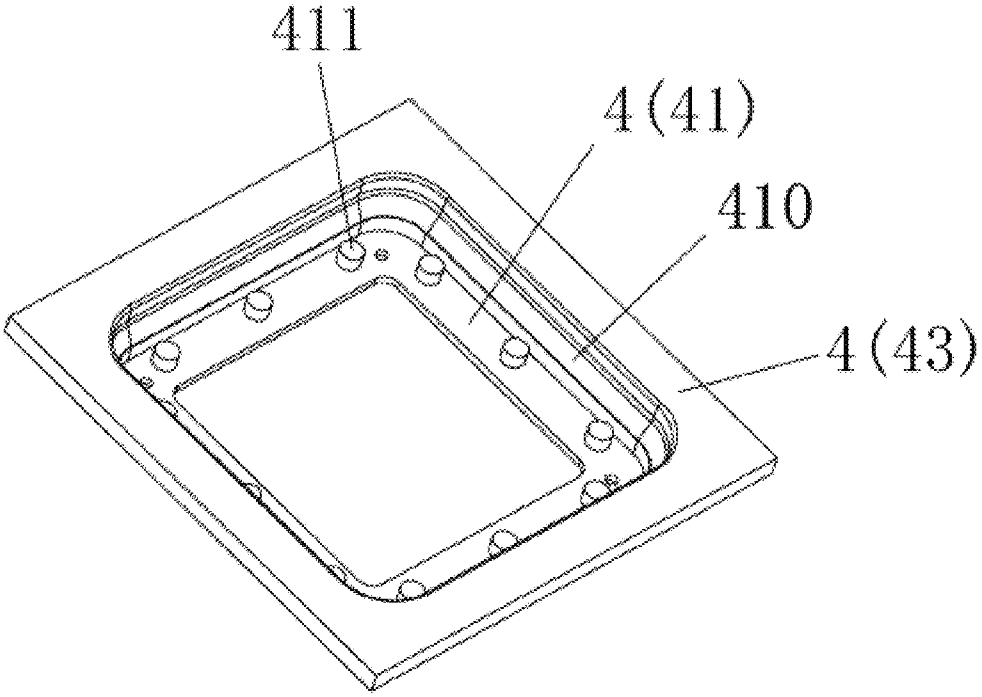
FIG. 4 is a schematic diagram of the lower surface structure of the flexible plate in the utility model.

As for the specific structure of the flexible plate 4, as shown in FIGS. 3 and 4, the flexible plate 4 of this embodiment has an upper arch 41, and an accommodating cavity 410 is formed in the upper arch 41, and the upper fixing plate 2 is embedded in the accommodating cavity 410, as shown in FIG. 1. Because the upper fixing plate 2 is embedded in the accommodating cavity 410 of the upper arch part 41, that is, the upper arch part 41 of the flexible plate 4 wraps the upper fixing plate 2, when any place on the upper fixing plate 2 is pressed as needed, only the upper arch part 41 of the flexible plate 4 needs to be pressed, which not only ensures that the force is transmitted to the upper fixing plate 2 to realize the pressing of the upper fixing plate 2, but also produces a good pressing feel.

Specifically, as shown in FIG. 3, the flexible plate 4 is mainly composed of the upper arch part 41, an expanding part 42 connected to the lower periphery of the upper arch part 41, and a base plate 43 connected to the periphery of the expanding part 42. In the specific installation, the upper fixing plate 2 is embedded in the upper arch 41, and the lower fixing plate 1 is located below the base plate 43. The setting of the expanding part 42 provides room for the balancing frame 3 to swing up and down.

As for the connection mode between the upper arch part 41 of the flexible plate 4 and the upper fixing plate 2, as shown in FIGS. 2 and 4, in this embodiment, a plurality of positioning protrusions 411 protrude downward from the top inside the upper arch part 41, and a plurality of positioning insertion holes 21 are formed in the upper fixing plate 2 for inserting the positioning protrusions 411. The positioning projection 411 is inserted into the positioning insertion hole 21 to realize the connection and positioning between the upper arch 41 and the upper fixing plate 2, which not only has high stability, but also facilitates the separation of the two when necessary.

In this embodiment, the flexible plate 4 is soft glue, specifically, the soft glue 4 is silica gel. Meanwhile, the upper fixing plate 2 is a hard plate with a hard plate structure, which facilitates the assembly of the balancing frame 3. Silica gel is used as the flexible plate 4, which provides a good feel for pressing.

In this embodiment, the lower part of the balancing frame 3 is rotatably connected to the lower fixing plate 1, and the upper part is rotatably connected to the upper fixing plate 2. When the flexible plate 4 is pressed down, the acting force is transmitted to the upper fixing plate 2, and the balancing frame 3 is forced to swing up and down between the upper fixing plate 2 and the lower fixing plate 1 to provide the pressing balance force, so that the whole assembly can be pressed down smoothly at every place on the flexible plate 4, and the balanced pressing function is realized.

In this embodiment, as shown in FIGS. 5 to 8, the balancing frame 3 includes a balancing frame A 31 rotatably connected between the lower fixing plate 1 and the upper fixing plate 2, and a balancing frame B 32 rotatably connected between the lower fixing plate 1 and the upper fixing plate 2, and the balancing frame A 31 and the balancing frame B 32 are rotatably connected.

Figure 5:
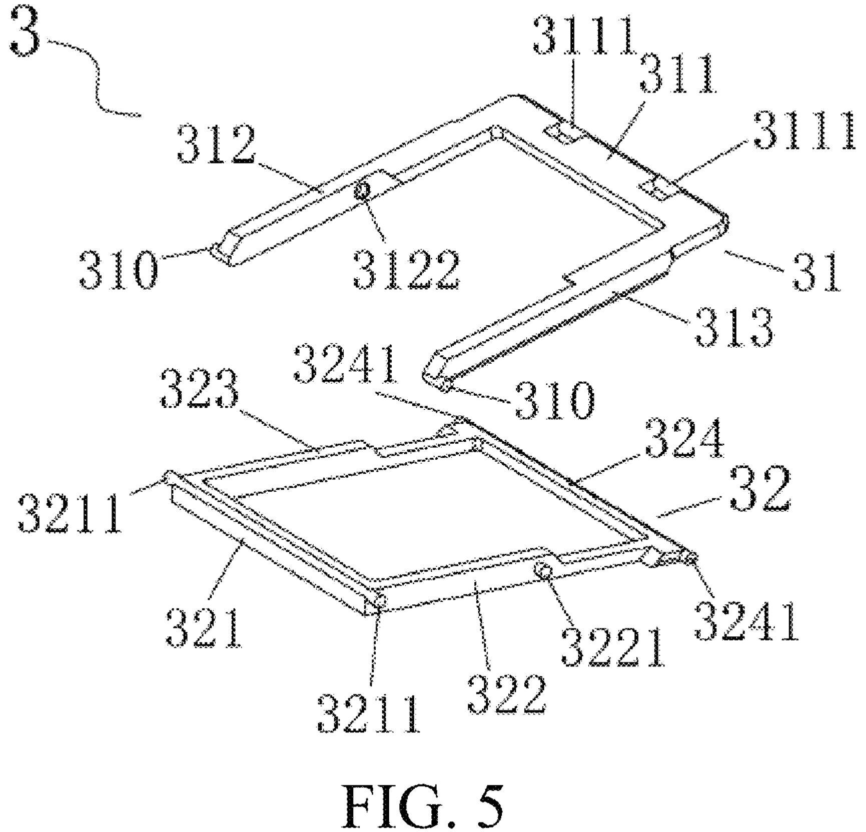
FIG. 5 is an exploded view of the balancing frame in the utility model.

Specifically, as shown in FIG. 5, the balancing frame A 31 includes a first cross bar 311, a first vertical bar 312 vertically connected to one end of the first cross bar 311, and a second vertical bar 313 vertically connected to the other end of the first cross bar 311, and the balancing frame A 31 has a U-shaped structure as a whole. A first rotating shaft 310 facing outward is respectively arranged at the end parts of the first vertical rod 312 and the second vertical rod 313, and two second rotating shafts 3111 are formed on the first horizontal rod 311.

Specifically, as shown in FIG. 5, the balancing frame B 32 includes a second horizontal bar 321, a third vertical bar 322 vertically connected to one end of the second horizontal bar 321, a fourth vertical bar 323 vertically connected to the other end of the second horizontal bar 321, and a third horizontal bar 324 connected between the third vertical bar 322 and the fourth vertical bar 323, and the balancing frame B has a mouth-shaped structure as a whole. A third rotating shaft 3211 is provided at both ends of the second cross bar 321, and a fourth rotating shaft 3241 is provided at both ends of the third cross bar 324.

As shown in FIG. 5, for the connection between the balancing frame A 31 and the balancing frame B 32, a rotating hole 3122 is respectively formed in the inner side of the first vertical rod 312 and the second vertical rod 313; On the outer sides of the third vertical rod 322 and the fourth vertical rod 323, a connecting rotating shaft 3221 movably clamped into the rotating hole 3122 is respectively provided.

Figure 6:
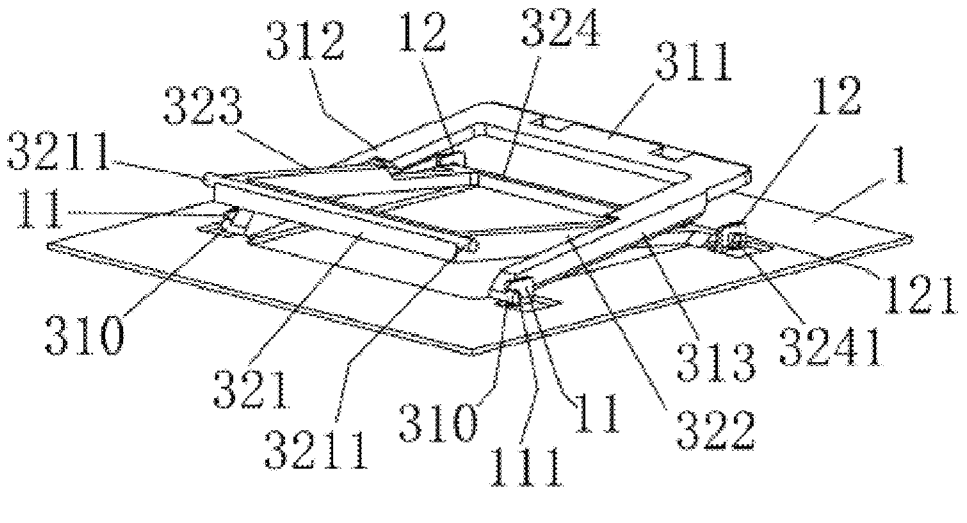
FIG. 6 is a schematic structural diagram of the combination of the balancing frame and the lower fixing plate in the utility model.

As shown in FIG. 6, the upper surface of the lower fixing plate 1 is provided with two first lower connecting blocks 11 and two second lower connecting blocks 12, and the side edges of the two first lower connecting blocks 11 are respectively provided with lower rotating grooves 111, and the two second lower connecting blocks 12 are respectively provided with a rotating hole 121. The first rotating shaft 310 of the balancing frame A 31 is movably engaged in the lower rotating groove 111 of the lower fixing plate 1, and the fourth rotating shaft 3241 of the balancing frame B 32 is movably engaged in the rotating hole 121 of the lower fixing plate 1. Because the first rotating shaft 310 of the balancing frame A 31 is movably clamped in the lower rotating groove 111 of the lower fixing plate 1, the first rotating shaft 310 can rotate in the lower rotating groove 111 or can be disengaged from the lower rotating groove 111 to move laterally; On the other hand, because the fourth rotating shaft 3241 of the balancing frame B 32 is movably clamped into the rotating hole 121 of the lower fixing plate 1, the fourth rotating shaft 3241 can only rotate in the rotating hole 121, and does not move laterally out of the rotating hole 121.

Figure 7:
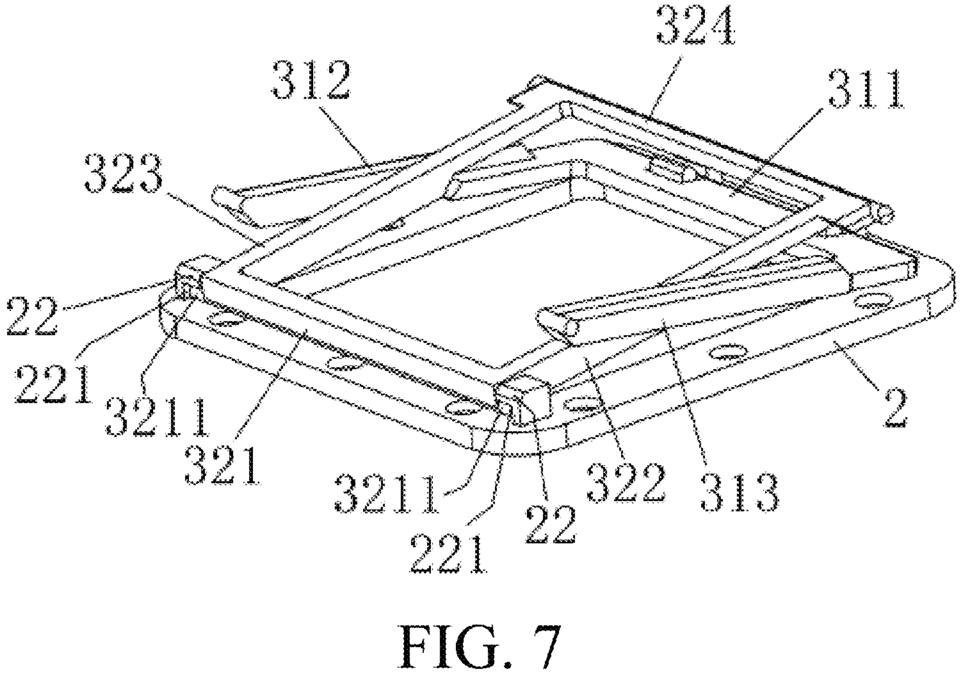
FIG. 7 is a structural schematic diagram of the combination of the balancing frame and the upper fixing plate in the utility model.
Figure 8:
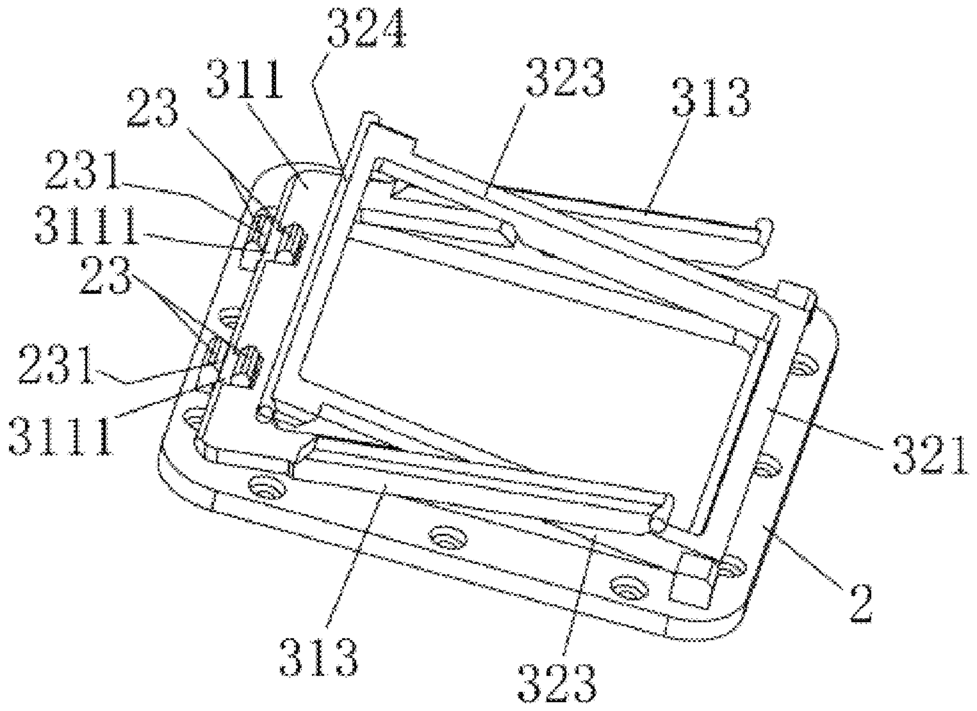
FIG. 8 is another structural schematic diagram of the combination of the balancing frame and the upper fixing plate in the utility model.

As shown in FIG. 7 and FIG. 8, two upper connecting blocks 22 and two groups of clamping blocks 23 are arranged on the lower surface of the upper fixing plate 2, and an upper rotating groove 221 is formed on the sides of the two upper connecting blocks 22, and a clamping groove 231 is formed on the two groups of clamping blocks 23. The second rotating shaft 3111 of the balancing frame A 31 is movably clamped into the clamping groove 231 of the upper fixing plate 2, and the third rotating shaft 3211 of the balancing frame B 32 is movably clamped into the upper rotating groove 221 of the upper fixing plate 2.

Because the second rotating shaft 3111 of the balancing frame A 31 is movably clamped in the clamping groove 231 of the upper fixing plate 2, the second rotating shaft 3111 can only rotate in the clamping groove 231, and does not move laterally out of the clamping groove 231; Because the third rotating shaft 3211 of the balancing frame B 32 is movably engaged in the upper rotating groove 221 of the upper fixing plate 2, the third rotating shaft 3211 can rotate in the upper rotating groove 221 or move laterally without the upper rotating groove 221.

When the upper fixing plate 2 moves down to drive the balancing frame 3 to rotate, in order to adapt to the downward pressure of the balancing frame A 31, the first rotating shaft 310 escapes from the lower rotating groove 111 and moves laterally, while the second rotating shaft 3111 rotates in the clamping groove 231; At the same time, in order to adapt to the downward movement of the balancing frame B 32 under pressure, the third rotating shaft 3211 escapes from the upper rotating groove 221 and moves laterally, while the fourth rotating shaft 3241 rotates in the rotating hole 121. On the contrary, when the upper fixing plate 2 is reset and moves upward to drive the balancing frame 3 to rotate, in order to adapt to the upward movement of the balancing frame A 31, the first rotating shaft 310 moves laterally in the opposite direction into the lower rotating groove 111, while the second rotating shaft 3111 rotates in the clamping groove 231; At the same time, in order to adapt to the upward movement of the balancing frame B 32, the third rotating shaft 3211 moves laterally in the opposite direction into the upper rotating groove 221, while the fourth rotating shaft 3241 rotates in the rotating hole 121. Therefore, when the upper fixing plate 2 moves up and down to exert force on the balancing frame 3, the balancing frame A 31 and the balancing frame B 32 can adaptively move laterally while rotating, so that the balancing frame 3 can swing up and down between the upper fixing plate 2 and the lower fixing plate 1 to provide a pressing balance force, so that the whole assembly can press down smoothly at every place on the flexible plate 4, and the balanced pressing function is realized.

For the problem of resetting the upper fixing plate 2 and the balancing frame 3, the elasticity of the flexible plate 4 can drive the upper fixing plate 2 and the balancing frame 3 to reset, or other elastic members can be added to reset, such as springs, which is not the focus of this utility model.

The balance assembly of this embodiment is particularly suitable for use in a button switch to provide a pressing balance force for the button switch. In order to facilitate the installation of other components (e.g., the conduction assembly) in the button switch, in this embodiment, a central perforation (40, 20, 10) is formed on the flexible plate 4, the upper fixing plate 2, and the lower fixing plate 1 respectively, and the central perforation (40, 20, 10) on the flexible plate 4, the upper fixing plate 2, and the lower fixing plate 1 correspond one by one.

The above is only the preferred embodiment of this utility model, and it does not limit the technical scope of this utility model. Therefore, other structures obtained by adopting the same or similar technical features as the above embodiments of this utility model are within the protection scope of this utility model.

What is claimed is:

1. A balancing assembly, comprising a lower fixing plate, an upper fixing plate, and a balancing frame arranged between the upper fixing plate and the lower fixing plate, wherein a flexible plate is arranged on the upper fixing plate;

wherein the flexible plate has an upper arch part; a plurality of positioning protrusions are projected downwards on a top inside the upper arch part, and a plurality of positioning jacks for inserting the plurality of positioning protrusions are opened on the upper fixing plate.

2. The balance assembly according to claim 1, wherein an accommodating cavity is formed in the upper arch part, and the upper fixing plate is embedded in the accommodating cavity.

3. The balance assembly according to claim 2, wherein the flexible plate consists of the upper arch part, an expanding part connected to a periphery of a lower part of the upper arch part, and a substrate connected to a periphery of the expanding part.

4. The balance assembly according to claim 1, wherein the flexible plate is rubber.

5. The balance component according to claim 4, wherein the rubber is silica gel.

6. The balance assembly according to claim 1, wherein a lower part of the balancing frame is rotatably connected to the lower fixing plate, and an upper part is rotatably connected to the upper fixing plate.

7. The balance assembly according to claim 1, wherein a central perforation is respectively formed on the flexible plate, the upper fixing plate and the lower fixing plate, and the flexible plate, the upper fixing plate and the lower fixing plate correspond to the central perforation one by one.

8. A balancing assembly, comprising a lower fixing plate, an upper fixing plate, and a balancing frame arranged between the upper fixing plate and the lower fixing plate, wherein a flexible plate is arranged on the upper fixing plate;

wherein the flexible plate is rubber.

9. The balance component according to claim 8, wherein the rubber is silica gel.

* * * * *